Dec. 23, 1924.
S. R. THORNTON
SOLDERING IRON
Filed Oct. 27, 1923
1,520,616
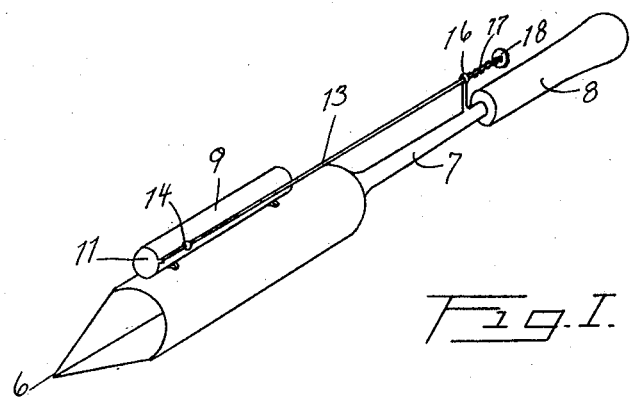
Fig. I.
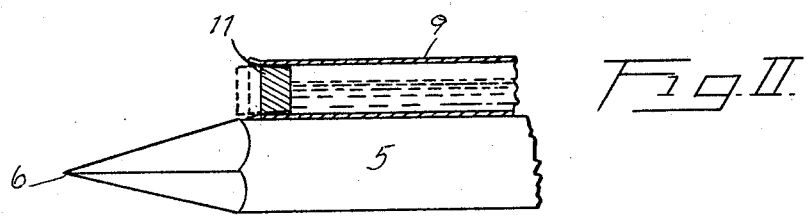
Fig. II.
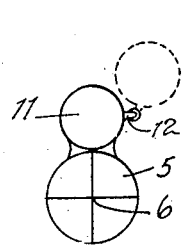
Fig. III.
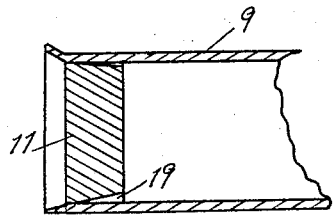
Fig. IV.
INVENTOR.
S. R. THORNTON
BY *Victor J. Evans*
ATTORNEY.

Patented Dec. 23, 1924.

1,520,616

UNITED STATES PATENT OFFICE.

STUART R. THORNTON, OF BERKELEY, CALIFORNIA.

SOLDERING IRON.

Application filed October 27, 1923. Serial No. 671,205.

*To all whom it may concern:*

Be it known that STUART R. THORNTON, a citizen of the United States, residing at Berkeley, in the county of Alameda and State of California, has invented new and useful Improvements in Soldering Irons, of which the following is a specification.

This invention relates to improvements in soldering irons and has particular reference to a means for delivering melted solder to the point of a soldering iron thereby eliminating the necessity of the operator holding a stick of solder and thus leaving his hand free for holding the work.

A further object is to provide a device of the character described which may be attached to any soldering iron now upon the market without materially altering the construction of the same.

Another object is to produce a device of this character which is simple in construction, and cheap to manufacture.

A still further object is to provide simple means for re-filling a solder container after the contents thereof have been used.

Other objects and advantages will be apparent during the course of the following description.

In the accompanying drawings forming a part of this specification, and in which like numerals are employed to designate like parts throughout the same, Figure 1 is a perspective view of my device attached to a soldering iron, Figure 2 is an enlarged detail cross-section of my device attached to a soldering iron, Figure 3 is a front elevation of Figure 2, and Figure 4 is an enlarged fragmentary detail view of the valve mechanism.

In the soldering of a joint, it is often necessary to hold the joint with a pair of pliers during the soldering operation, with the result that if the iron is at all crusted so that it will not hold or pick up the solder, it is necessary to let go of the work and apply a stick of solder to the end of the iron. The result being that often times much delay is caused in again getting the parts in proper alignment previous to applying the solder and the iron to the joint.

In the accompanying drawings wherein for the purpose of illustration is shown a preferred embodiment of my invention, the numeral 5 designates the usual soldering iron having a pointed tip 6 and provided with a rearwardly extending extension 7 to which is secured the usual handle 8.

Upon the iron 5, I mount a cylindrical receptacle or reservoir 9. This reservoir may be attached to the iron in any convenient manner or may be formed integral therewith without departing from the spirit of this invention. One end of this reservoir is closed, while the opposite end or end toward the pointed tip 6 of the iron is opened and closed by a valve 11.

This valve 11 is provided with an extension 12 to which an operating rod 13 is secured. This rod 13 is slidably secured to the reservoir 9 by a bracket 14 and to the extension 7 by a bracket 16.

A coil spring 17 is positioned upon the rod 13 at a point between the bracket 16 and a finger piece 18. By now viewing Figure 4, it will be noted that the valve 11 has a cut-away portion 19 upon its lower periphery. The result being that as the valve is moved to its dotted line position of Figure 2, a small port will be opened allowing a small amount of solder to flow from the reservoir 9 onto the hot iron 5 and thence to the point 6.

The manner of operating my device is as follows:—

Assuming that the device has just been attached to an iron, the rod 13 is pushed forwardly by the thumb of the operator pushing against the finger piece 18. After the valve has been moved entirely out of the end of the reservoir, the same is swung to the dotted line position of Figure 3. Solder in any form is then placed in the reservoir 9 and the valve again returned to its normal position.

As soon as heat is applied to the iron 5, the solder placed in the reservoir will melt and be ready for use. When the operator then desires to use the iron, he merely presses against the finger piece which causes the valve 11 to move downwardly and allow a small amount of melted solder to flow to the point of the iron. As soon as the thumb is released from the finger piece the spring 17 will act to return the valve 11 to its closed position.

It will thus be seen that I have devised a very simple means for applying melted solder to the end of a soldering iron.

It is to be understood that the form of my invention, herewith shown and described is to be taken as a preferred example of the same and that various changes in the shape, size and arrangement of parts may be resorted to without departing from the spirit of the invention or the scope of the subjoined claim.

Having thus described my invention, I claim:—

In a device of the character described, a reservoir adapted to be secured to a soldering iron at a point outside of its periphery in such a manner as to receive heat therefrom, said reservoir being tubular in shape and having a flared open end, a valve slidably secured in the open end of said reservoir, said valve having a groove formed in its lower portion and adapted to discharge melted metal from said reservoir to said soldering iron, a rod secured to said valve and slidably holding said valve to said soldering iron, said rod being capable of longitudinal movement for the purpose of controlling the movement of said valve, for the purpose specified.

In testimony whereof I affix my signature.

STUART R. THORNTON